(12) United States Patent
Sato

(10) Patent No.: US 12,077,481 B2
(45) Date of Patent: Sep. 3, 2024

(54) FERTILIZER ABSORPTION IMPROVEMENT METHOD

(71) Applicant: AQUASOLUTION CORPORATION, Nagano (JP)

(72) Inventor: Takashi Sato, Tokyo (JP)

(73) Assignee: AQUASOLUTION CORPORATION, Nagano (JP)

(*) Notice: Subject to any disclaimer, the term of this patent is extended or adjusted under 35 U.S.C. 154(b) by 901 days.

(21) Appl. No.: 17/058,296

(22) PCT Filed: May 29, 2019

(86) PCT No.: PCT/JP2019/021265
§ 371 (c)(1),
(2) Date: Nov. 24, 2020

(87) PCT Pub. No.: WO2019/230788
PCT Pub. Date: Dec. 5, 2019

(65) Prior Publication Data
US 2021/0153426 A1 May 27, 2021

(30) Foreign Application Priority Data
May 30, 2018 (JP) .................. 2018-103097

(51) Int. Cl.
A01C 21/00 (2006.01)
A01G 22/35 (2018.01)
A01G 22/60 (2018.01)
A01G 25/02 (2006.01)
C05G 3/00 (2020.01)

(52) U.S. Cl.
CPC ............... *C05G 3/00* (2013.01); *A01C 21/00* (2013.01); *A01G 22/35* (2018.02); *A01G 22/60* (2018.02); *A01G 25/02* (2013.01)

(58) Field of Classification Search
None
See application file for complete search history.

(56) References Cited

U.S. PATENT DOCUMENTS

2014/0031233 A1    1/2014   Mukumoto et al.

FOREIGN PATENT DOCUMENTS

| CA | 2954649     | * | 7/2017 | ............ C09K 17/40 |
| CN | 104381072 A | * | 3/2015 | ........... A01G 17/005 |
| CN | 107836290 A | * | 3/2018 | ............ A01C 21/00 |
| JP | 08-012479 A |   | 1/1996 |                        |

(Continued)

OTHER PUBLICATIONS

H. Tsuji, "Nano-bubble generation, bubble size measurement and industrial applications of nano-bubbles", Generation of Legutsuyasu, Nanobubbles, and verification thereof (particle size distribution measurement), Demonstration of use of nanobubbles, Lecture of mixed Phase Flow Society 2009 (Kumamoto University), mixed phase flow research, Aug. 2009, Aug. 2015.

(Continued)

*Primary Examiner* — Wayne A Langel
(74) *Attorney, Agent, or Firm* — Rimon P.C.

(57) ABSTRACT

The present invention addresses the problem of providing a fertilizer absorption improvement method that makes it possible to conveniently improve fertilizer absorption. This fertilizer absorption improvement method involves applying nano-bubble water to a plant.

4 Claims, 1 Drawing Sheet

(56) References Cited

FOREIGN PATENT DOCUMENTS

| JP | 2006-042785 A |   | 2/2006  |            |
|----|---------------|---|---------|------------|
| JP | 2008-093624 A |   | 4/2008  |            |
| JP | 2010-094117 A | * | 4/2010  | C09K 17/02 |
| JP | 2010-179266 A |   | 8/2010  |            |
| JP | 2011-255294 A | * | 12/2011 | C05G 3/00  |
| JP | 2012-034649 A | * | 2/2012  | A01G 31/00 |
| JP | 2012-096216 A |   | 5/2012  |            |
| JP | 2013-078761 A | * | 5/2013  | C05G 5/00  |
| JP | 2014-039487 A |   | 3/2014  |            |
| JP | 2015-097509 A | * | 5/2015  | A01G 31/00 |
| JP | 2015-097515 A | * | 5/2015  | A01G 31/00 |
| JP | 2018-007646 A |   | 1/2018  |            |
| JP | 2018-069193 A |   | 5/2018  |            |
| KR | 20150068572 A | * | 6/2015  | A01G 7/00  |
| RU | 1806517 C     |   | 4/1993  |            |
| RU | 2582368 C2    |   | 4/2016  |            |
| WO | WO 2018/074209 | * | 4/2018  | B65D 77/08 |

OTHER PUBLICATIONS

International Search Report issued in corresponding International Patent Application No. PCT/JP2019/021265, Aug. 27, 2019, with English translation.

Brochure of "Big-water DH", [online], Hoei Co., Ltd., [search on Aug. 26, 2022], Internet < URL:https://web.archive.org/web/20161020105548/http://suiei.co.jp/panf.pdf >, with partial English translation.

Japanese Notice of Reasons for Refusal issued in corresponding Japanese Patent Application No. 2020-522246, Sep. 13, 2022, with English translation.

* cited by examiner

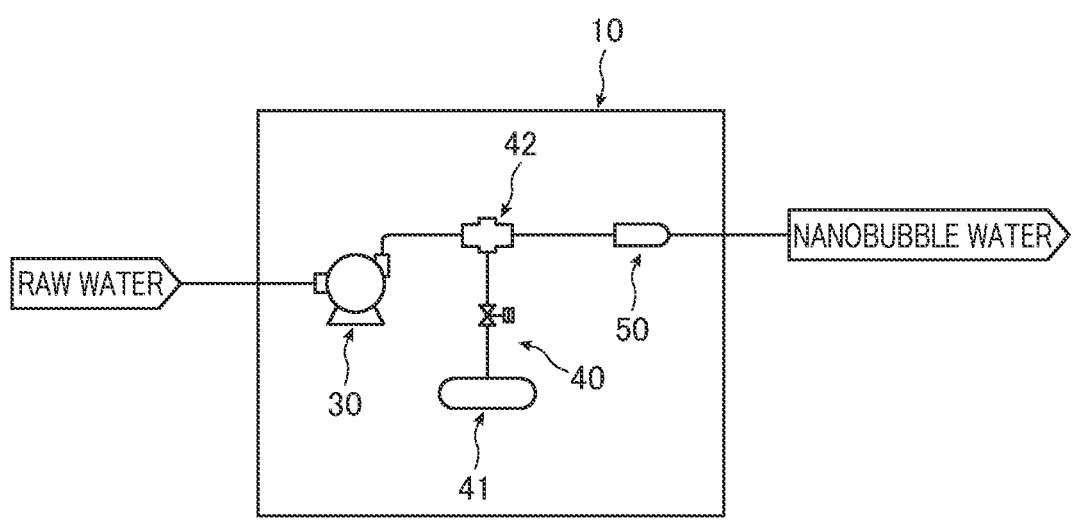

FERTILIZER ABSORPTION IMPROVEMENT METHOD

CROSS REFERENCE TO RELATED APPLICATIONS

This application is the U.S. National Phase under 35 U.S.C. § 371 of International Application No. PCT/JP2019/021265, filed on May 29, 2019, which claims the benefit of Japanese Application No. 2018-103097, filed on May 30, 2018, the entire contents of each are hereby incorporated by reference.

TECHNICAL FIELD

The present invention relates to a method for fertilizer absorption improvement.

BACKGROUND ART

It is desirable to promote the growth of plants and to increase the yield of vegetables, crops, fruits and the like in terms of an increase in food production and the farming efficiency.

Hence, various plant growth promoters and fertilizer response accelerators have been conventionally developed.

For instance, Patent Literature 1 proposes a fertilizer response accelerator comprising alginate oligosaccharide as an effective ingredient ([Claim 1]) and also proposes a method for improving fertilizer efficiency characterized in that the fertilizer response accelerator is applied through foliar spray, irrigation, hydroponic culture or directly applied to soil ([Claim 7]).

CITATION LIST

Patent Literature

Patent Literature 1: JP H08-012479 A

SUMMARY OF INVENTION

Technical Problems

The inventor of the present invention studied the method for improving fertilizer efficiency described in Patent Literature 1 and found that the method has a problem of, e.g., difficulty in controlling the alginate oligosaccharide content when applied to soil or the like.

Accordingly, an object of the present invention is to provide a method for fertilizer absorption improvement capable of improving fertilizer absorption with a simple operation.

Solution to Problems

The present inventor has conducted an intensive study to attain the above-described object and found that application of nanobubble water to a plant can improve fertilizer absorption, whereby the present invention has been completed.

That is, the present inventor found that the above-described object can be attained by the following constitution.

[1] A method for fertilizer absorption improvement, the method comprising applying nanobubble water to a plant.

[2] The method for fertilizer absorption improvement according to [1], wherein sprinkling is carried out using the nanobubble water.

[3] The method for fertilizer absorption improvement according to [1] or [2], wherein the nanobubble water contains bubbles with a modal particle size of from 10 to 500 nm.

[4] The method for fertilizer absorption improvement according to any one of [1] to [3], wherein bubbles contained in the nanobubble water include at least one type of gas selected from the group consisting of oxygen, nitrogen, carbon dioxide and ozone.

[5] The method for fertilizer absorption improvement according to any one of [1] to [4], wherein the nanobubble water contains bubbles in an amount of from $1 \times 10^8$ to $1 \times 10^{10}$ bubbles/mL.

[6] The method for fertilizer absorption improvement according to any one of [1] to [5], wherein the plant is selected from flowers and ornamental plants or from root vegetables.

[7] The method for fertilizer absorption improvement according to [6], wherein the plant is a primulaceous plant or a brassicaceous plant.

[8] The method for fertilizer absorption improvement according to [7], wherein the plant is cyclamen or radish.

Advantageous Effects of Invention

The present invention can provide a method for fertilizer absorption improvement capable of improving fertilizer absorption with a simple operation.

BRIEF DESCRIPTION OF DRAWINGS

FIG. 1 is a schematic view showing an example of a nanobubble generating apparatus.

DESCRIPTION OF EMBODIMENTS

The present invention is described below in detail.

While the constitutional requirements may be described below based on a typical embodiment of the present invention, the present invention is not limited to the embodiment.

In the description, a numerical range indicated using the form of "(from) . . . to . . . " should read as a range including the former number as the lower limit value and the latter number as the upper limit value.

The method for fertilizer absorption improvement of the present invention (hereinafter also simply referred to as "improvement method of the invention") is a method for fertilizer absorption improvement in which nanobubble water is applied to a plant.

The "fertilizer absorption" is also referred to as fertilizer efficiency and means a ratio of fertilizer ingredients having been absorbed and used by a plant, to a fertilizer fed to the plant.

Nanobubble water and optional components used in the improvement method of the invention will be described below in detail.

[Nanobubble Water]

Nanobubble water used in the improvement method of the invention is water which contains bubbles having a diameter of less than 1 μm and into which the bubbles are incorporated. The expression "water into which the bubbles are incorporated" intends to exclude water containing the bubbles that are inevitably contained due to, for example, water (such as well water containing impurities) used to generate nanobubble water.

The diameter (particle size) of bubbles contained in nanobubble water, as well as the modal particle size of bubbles and the number of bubbles to be described later are the values that are measured using the nanoparticle tracking analysis of the Brownian motion-moving speed of bubbles in water. In the present description, numeral values measured by the nanoparticle analysis system, NanoSight series (manufactured by NanoSight Ltd.) are used.

The nanoparticle analysis system, NanoSight series (manufactured by NanoSight Ltd.) can measure the Brownian motion speed of particles and calculate the diameter (particle size) based on the measured speed. The modal particle size can be determined as the mode diameter from the particle size distribution of the existing nanoparticles.

In the present invention, the modal particle size of bubbles contained in the nanobubble water is preferably from 10 to 500 nm, more preferably from 30 to 300 nm, and even more preferably from 70 to 130 nm, because fertilizer absorption can be further improved.

Gas constituting bubbles contained in the nanobubble water is not particularly limited but is preferably gas other than hydrogen from the view point of a longtime existence in water. Specific examples of the gas include air, oxygen, nitrogen, fluorine, carbon dioxide and ozone.

Among these, it is preferable to contain at least one type of gas selected from the group consisting of oxygen, nitrogen, carbon dioxide and ozone because fertilizer absorption is further improved. In particular, it is more preferable to contain oxygen because a plant grows well, and the bubbles can exist for a longer period of time.

Here, "containing oxygen" means to contain oxygen at a higher concentration than the oxygen concentration in air. The same applies to nitrogen and carbon dioxide. The oxygen concentration is preferably not less than 30 vol % of the bubbles, and preferably more than 50 vol % and not more than 100 vol %.

The nanobubble water contains bubbles in an amount of preferably from $1\times10^8$ to $1\times10^{10}$ bubbles/mL because fertilizer absorption is further improved, more preferably more than $1\times10^8$ bubbles/mL and less than $1\times10^{10}$ bubbles/mL because the bubble generation time and the bubble existence are particularly well balanced, and even more preferably from $5\times10^8$ to $5\times10^9$ bubbles/mL because fertilizer absorption is further more improved.

Exemplary methods of generating the nanobubble water include a static mixer method, a venturi method, a cavitation method, a vapor condensation method, an ultrasonic method, a swirling flow method, a pressurized dissolution method and a fine pore method.

The fertilizer absorption improvement method of the invention may include a generation step of generating the nanobubble water prior to application of the nanobubble water. That is, the improvement method of the invention may be a controlling method including, for example, a generation step of introducing water from a water source such as a water storage tank, a well or agricultural water into a nanobubble generating apparatus to generate nanobubble water, and an application step of applying the generated nanobubble water. Exemplary techniques of introducing water from a water source into a nanobubble generating apparatus include a technique in which water is drawn from a water source using a tub, a pump or another device and supplied to the nanobubble generating apparatus, and a technique in which water is directly supplied to a nanobubble generating apparatus from a flow path that is installed between a water source and the nanobubble generating apparatus and connected to the nanobubble generating apparatus.

As the method of generating the nanobubble water, a generation method using an apparatus that does not intentionally generate a radical is preferred, and a specific example thereof is a generation method using, for instance, the nanobubble generating apparatus described in paragraphs [0080] to [0100] of JP2018-15715 A. The foregoing is incorporated in the present description.

Another example of the nanobubble generating apparatus that does not intentionally generate a radical is an ultrafine bubble generating apparatus including a liquid discharger that discharges water, a gas incorporating device that pressurizes gas and incorporates the gas into the water discharged from the liquid discharger, and an ultrafine bubble generator that allows the water having the gas incorporated therein to pass through an inside of the ultrafine bubble generator to generate ultrafine bubbles in the water, wherein, between the liquid discharger and the ultrafine bubble generator, the gas incorporating device pressurizes gas and incorporates the gas into a liquid being in a pressurized state flowing toward the ultrafine bubble generator. Specifically, a generation method using a nanobubble generating apparatus shown in FIG. 1 is exemplified.

A nanobubble generating apparatus 10 shown in FIG. 1 includes therein a liquid discharger 30, a gas incorporating device 40 and a nanobubble generating nozzle 50.

The liquid discharger 30 comprising a pump draws raw water of nanobubble water (e.g., well water) therein and discharges the raw water. The gas incorporating device 40 includes a vessel 41, in which pressurized gas is enclosed, and a substantially cylindrical gas incorporating device body 42. While allowing the water discharged from the liquid discharger 30 to flow inside the gas incorporating device body 42, the gas incorporating device 40 introduces the pressurized gas of the vessel 41 into the gas incorporating device body 42. In this manner, gas-incorporated water is generated in the gas incorporating device body 42.

The nanobubble generating nozzle 50 is to generate nanobubbles in the gas-incorporated water according to the principle of pressurized dissolution when the gas-incorporated water passes through an inside of the nanobubble generating nozzle 50, and the structure thereof may be the same as the structure of the nanobubble generating nozzle described in JP2018-15715 A. Nanobubble water generated in the nanobubble generating nozzle 50 is ejected from a tip end of the nanobubble generating nozzle 50, then flows out the nanobubble generating apparatus 10, and is delivered to a predetermined destination via a flow path that is not shown.

As described above, between the liquid discharger 30 and the nanobubble generating nozzle 50 in the nanobubble generating apparatus 10, the gas incorporating device 40 introduces pressurized gas into water (raw water) being in a pressurized state flowing toward the nanobubble generating nozzle 50. In this manner, defects such as cavitation that may occur when gas is incorporated into water on the intake side (suction side) of the liquid discharger 30 can be avoided. Since gas is incorporated into water as being in a pressurized (compressed) state, gas can be incorporated into water against the water pressure at the gas incorporation location. Accordingly, gas can be appropriately incorporated into water without particularly generating a negative pressure at the gas incorporation location.

In addition, the liquid discharger 30 is connected on the suction side thereof with the flow path of water supplied from a water source such as a well or a water tap, and the pressure of the water flowing from the upstream side of the liquid discharger 30 into the liquid discharger 30 in the flow path (i.e., the water pressure on the suction side) is preferably a positive pressure. When this is the case, the above-described constitution is more effective. More specifically, when the water pressure (the suction pressure) on the upstream side of the liquid discharger 30 is a positive pressure, gas is incorporated into water on the downstream side of the liquid discharger 30; the constitution of the nanobubble generating apparatus 10 capable of appropriately incorporating gas into water also on the downstream side of the liquid discharger 30 becomes more significant.

Further, water used to generate the nanobubble water is not particularly limited, and use can be made of, for example, rainwater, tap water, well water, agricultural water and distilled water.

Such water may be water that has been subjected to another treatment before being used to generate nanobubble water. Another treatment may be exemplified by pH adjustment, precipitation, filtration, or disinfection (sterilization). In particular, when agricultural water is used, for instance, agricultural water that has been typically subjected to at least one of precipitation and filtration may be used.

In the present invention, a mode of applying the nanobubble water to a plant varies depending on the plant cultivation method and thus is not particularly limited, and examples thereof include a mode where the nanobubble water is sprinkled in the soil culture, a mode where agrochemicals diluted with the nanobubble water are sprayed in the soil culture, a mode where a culture medium is supplied with a culture liquid diluted with the nanobubble water in the nutrient solution culture (water culture, spray culture, solid medium culture) or nutrient-solution soil culture (irrigation and fertilization culture), and a mode where the nanobubble water alone is sprinkled (applied through irrigation) in the nutrient-solution soil culture.

Among these, the mode where the nanobubble water is sprinkled is preferred because the fertilizer absorption improvement can be achieved through the simpler operation.

Here, the method of "sprinkling water" as one of the application modes is not particularly limited, and when the culture method is the soil culture, for example, a method involving spraying water over an entire of a plant, a method involving spraying water over a part of a plant (e.g., stems or leaves), and a method involving spraying water over soil in which a plant is planted may be adopted. When the culture method is the nutrient-solution soil culture, the water sprinkling may be carried out through irrigation as described above.

In the present invention, the timing for application of the nanobubble water to a plant varies depending on the application mode or the plant type and thus is not particularly limited. For example, when flowers or ornamental plants are cultivated in the soil culture, the application timing may be an entire period from the seeding to the harvesting, or the nanobubble water may be applied only in a certain period of time (e.g., at the seeding and in the seedling-raising period).

<Additional Component>

The nanobubble water may further contain an additional component.

Examples of the additional components include an agrochemical, a fertilizer, a surfactant, an antifreezing agent, a defoaming agent, a preservative, an antioxidant and a thickening agent. The type and an amount of an additional component are not particularly limited and may be selected depending on the intended purpose.

Meanwhile, in the present invention, it is preferable that the additional component contains substantially no radical in the nanobubble water. "Containing substantially no radical" does not mean to exclude a case where a radical is inevitably contained due to water (e.g., well water containing impurities) used to generate the nanobubble water but means to exclude a case where a radical is generated and added through a certain operation.

[Plant]

In the present invention, the plant to which the nanobubble water is applied is not particularly limited and is preferably a plant that is artificially fed with a fertilizer for cultivation.

Examples of the plant include flowers and ornamental plants such as rosaceous plants (for example, rose), primulaceous plants (for example, *Primula sieboldii* and cyclamen), liliaceous plants (for example, tulip), plantaginaceous plants (for example, *antirrhinum*), asteraceous plants (for example, dahlia, *Chrysanthemum morifolium* and *gerbera*), and orchidaceous plants (for example, orchid);

fruit vegetables such as solanaceous plants (for example, eggplant, pepino, tomato (including grape tomato), tamarillo, *Capsicum annum*, shishito pepper, habanero, bell pepper, paprika and colored bell pepper), araliaceous plants (for example, *Gamblea innovans*), cucurbitaceous plants (for example, pumpkin, zucchini, cucumber, *Cucumis metuliferus, Cucumis melo* var. *conomon, Momordica charantia, Benincasa hispida*, chayote, *Luffa cylindrica*, calabash, watermelon, melon and *Cucumis melo* var. *makuwa*), malvaceae plants (for example, okra), and rosaceous plants (for example, strawberry);

stem and leaf vegetables such as cabbage, onion, green onion, Chinese cabbage, spinach, lettuce, broccoli, komatsuna (*Brassica rapa* var.), *Allium tuberosum*, asparagus, celery, garland *chrysanthemum*, cauliflower, garlic and *Allium chinense;* root vegetables such as brassicaceous plants (for example, Japanese radish, turnip and radish (*Raphanus sativus* var. *sativus*)), ammiaceous plants (for example, carrot), asteraceous plants (for example, burdock), and lotus root;

fruit trees such as rutaceous plants (for example, citrus unshiu), rosaceous plants (for example, apple, peach, plum, *Myrica rubra, Pseudocydonia sinensis*, nashi (*Pyrus pyrifolia*), pear, *Prunus mume*, apricot, cherry, *rubus*, raspberry, blackberry and loquat), musaceous plants (for example, banana), vitaceous plants (for example, grape), elaeagnaceous plants (for example, *oleaster*), ericaceous plants (for example, blueberry), moraceous plants (for example, mulberry and fig), ebenaceous plants (for example, persimmon), lardizabalaceous plants (for example, *Akebia quinata*), anacardiaceous plants (for example, mango), lauraceous plants (for example, avocado), rhamnaceous plants (for example, jujube), lythraceous plants (for example, pomegranate), passifloraceous plants (for example, passion fruit), bromeliaceous plants (for example, pineapple), caricaceous plants (for example, *papaya*), actinidiaceous plants (for example, kiwifruit), fagaceous plants (for example, chestnut), sapotaceous plants (for example, miracle fruit), myrtaceous plants (for example, guava), oxalidaceous plants (for example, star fruit), and malpighiaceous plants (for example, acerola).

Among these, flowers and ornamental plants and root vegetables are preferred, primulaceous plants and brassicaceous plants are more preferred, and cyclamen and radish are further more preferred, because the improvement method of the invention exhibits the higher efficiency.

Examples

The present invention is described below more specifically by way of examples. The materials, amounts of use, ratios, treatments and treatment procedures illustrated in the examples below may be modified as appropriate as long as they do not depart from the scope and spirit of the present invention. Therefore, the scope of the present invention should not be construed as being limited to the following examples.

[Experiment 1]
<Details of Experiment 1>

The experiment was carried out in a greenhouse for cyclamen cultivation in Yokohama-shi, Kanagawa, with the following separated areas.

Test area 1-1: During a period from February to July in 2017, in a greenhouse having 10,000 pots of cyclamens, nanobubble water generated by the method described below was used for sprinkling (sprinkled by hand) once or twice a week.

Test area 1-2: During a period from February to July in 2016, in a greenhouse having 10,000 pots of cyclamens, tap water was used for sprinkling (sprinkled by hand) once or twice a week, and nanobubble water was not used.

According to a normal method, the sprinkling amount was appropriately varied depending on the growth of cyclamen, the weather or other factors and was controlled to be generally same in both the test areas.

<Nanobubble Water Generation Method>

Nanobubble water was generated using a nanobubble generating apparatus [100V, 10 L/min type; manufactured by Kakuichi Co., Ltd., Aqua Solution Division (currently Aqua Solutions Corporation)] where bubbles (nanobubbles) were generated in water by the pressurized dissolution.

Water used to generate nanobubble water was tap water, and the gas used to form the bubbles was oxygen (industrial oxygen, oxygen concentration: 99.5 vol %).

Nanobubbles were generated using the foregoing nanobubble generating apparatus under the conditions with which the analysis by the nanoparticle analysis system, NanoSight LM10 (manufactured by NanoSight Ltd.) would have the following results.

Number of bubbles per 1 mL of water: $5 \times 10^8$ bubbles/mL
Modal particle size of bubbles: 100 nm <Evaluation of Fertilizer Absorption>

In each test area, amounts of nitrate nitrogen and phosphoric acid in sap of the cultivated cyclamen were measured. The results are shown below.

Test area 1-1: On Jul. 14, 2017, an arbitrary leaf was collected from an arbitrary pot of cyclamen, and amounts of nitrate nitrogen and phosphoric acid in sap of the leaf were measured. As a result, the amounts of nitrate nitrogen and phosphoric acid were 309.6 ppm and 149.4 ppm, respectively.

Test area 1-2: On Jul. 12, 2016, an arbitrary leaf was collected from an arbitrary pot of cyclamen, and amounts of nitrate nitrogen and phosphoric acid in sap of the leaf were measured. As a result, the amounts of nitrate nitrogen and phosphoric acid were 232.8 ppm and 67.2 ppm, respectively.

[Experiment 2]
<Details of Experiment 2>

The experiment was carried out in an agricultural field of radish cultivation in Komoro-shi, Nagano from Aug. 29, 2018 (seeding) to Oct. 8, 2018 (harvesting), with the following separated areas. The respective test areas were made in the same plastic house.

Test area 2-1: In the plastic house culture, agricultural water was used for sprinkling once in two days, and nanobubble water was not used.

Test area 2-2: In the plastic house culture, nanobubble water in which the number of bubbles per 1 mL of water was adjusted to $2 \times 10^8$ bubbles/mL was used for sprinkling once in two days.

Test area 2-3: In the plastic house culture, nanobubble water in which the number of bubbles per 1 mL of water was adjusted to $5 \times 10^8$ bubbles/mL was used for sprinkling once in two days.

In each of the test areas, radish was seeded in two pots placed in the plastic house and cultivated.

According to a normal method, the sprinkling amount was appropriately varied depending on the growth of radish, the weather or other factors and was controlled to be generally same in the three test areas.

In addition, in Experiment 2, application of agrochemicals was purposely omitted in order to verify the superiority associated with the number of bubbles in 1 mL of nanobubble water.

<Nanobubble Water Generation Method>

Nanobubble water was generated using a nanobubble generating apparatus (100V, 10 L/min type; manufactured by Aqua Solutions Corporation) where bubbles (nanobubbles) were generated in water by the pressurized dissolution. Water used to generate nanobubble water was agricultural water, and the gas used to form the bubbles was oxygen (industrial oxygen, oxygen concentration: 99 vol %).

Among the conditions for generating nanobubbles using the foregoing nanobubble generating apparatus, the bubble size (modal particle size) was set to be 100 nm.

The number of bubbles per 1 mL of nanobubble water was $2 \times 10^8$ bubbles/mL in the test area 2-2 and was $5 \times 10^8$ bubbles/mL in the test area 2-3 as described above. The number of bubbles per 1 mL of nanobubble water can be adjusted by, for example, providing a nanobubble water storage tank on the downstream side of the nanobubble generating apparatus, sending nanobubble water of the storage tank back to the nanobubble generating apparatus to allow the nanobubble water to circulate in the system, and varying the circulation time.

<Evaluation of Fertilizer Absorption>

In the test areas 2-1 to 2-3, on Oct. 8, 2018, an edible part of radish was collected from each pot, amounts of available nitrate nitrogen, phosphoric acid and potassium in sap of the edible part were measured, and their average amounts were calculated. The results are shown in Table 1 below.

TABLE 1

|  | Test area 2-1 | Test area 2-2 | Test area 2-3 |
| --- | --- | --- | --- |
| Nitrate nitrogen (mg/100 cc) | 45.8 | 55.5 | 138.9 |
| Phosphoric acid (mg/100 cc) | 67.2 | 97.5 | 99.8 |
| Potassium (mg/100 cc) | 297.0 | 305.0 | 327.0 |

The results shown in Table 1 reveal that, compared to the test area 2-1 where nanobubble water was not applied, in the test area 2-2 and the test area 2-3 where nanobubble water was applied, amounts of nitrate nitrogen, phosphoric acid and potassium all increased, and the fertilizer absorption was improved.

In particular, compared to the test area 2-2 where the number of bubbles in 1 mL of nanobubble water was $2\times10^8$ bubbles/mL, in the test area 2-3 where the number of bubbles per 1 mL of nanobubble water was $5\times10^8$ bubbles/mL, an amount of nitrate nitrogen largely increased, revealing that the fertilizer absorption was further improved.

As described above, the results of Experiment 1 and Experiment 2 clearly show that application of nanobubble water improves the fertilizer absorption.

REFERENCE SIGNS LIST

10 nanobubble generating apparatus
30 liquid discharger
40 gas incorporating device
41 vessel
42 gas incorporating device body
50 nanobubble generating nozzle

The invention claimed is:

1. A method for improving an absorption rate of a fertilizer containing at least nitrate nitrogen, the method comprising spraying nanobubble water over soil in which a plant is planted,
   wherein the nanobubble water contains bubbles with a modal particle size of from 30 to 300 nm,
   wherein the nanobubble water contains the bubbles in an amount of from $1\times10^8$ to $1\times10^{10}$ bubbles/mL, and
   wherein the bubbles contained in the nanobubble water include i) air or ii) oxygen having a concentration higher than a concentration of oxygen in the air.

2. The method according to claim 1, wherein the plant is selected from the group consisting of flowers, ornamental plants, and root vegetables.

3. The method according to claim 2, wherein the plant is a primulaceous plant or a brassicaceous plant.

4. The method according to claim 3, wherein the plant is cyclamen or radish.

* * * * *